UNITED STATES PATENT OFFICE.

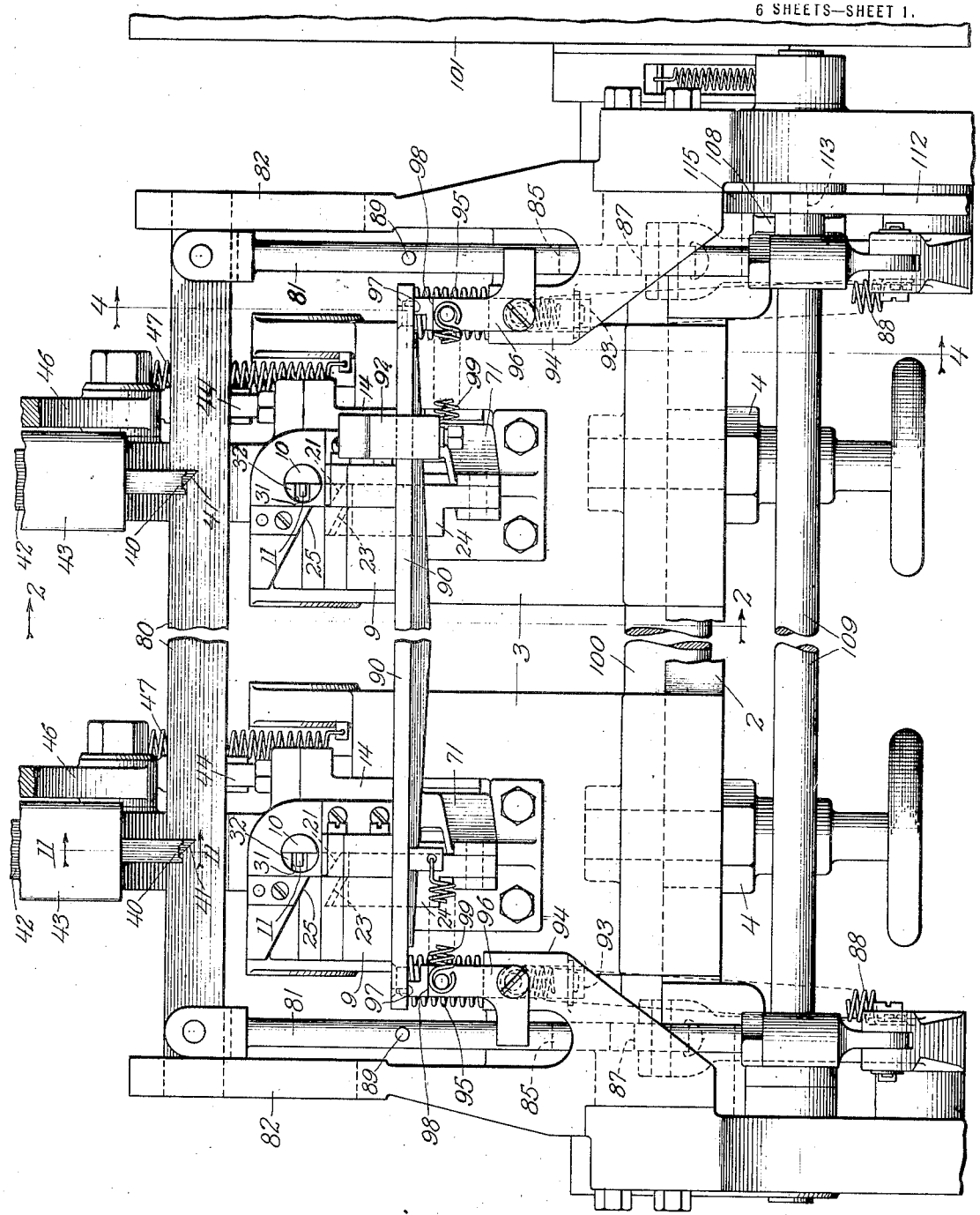

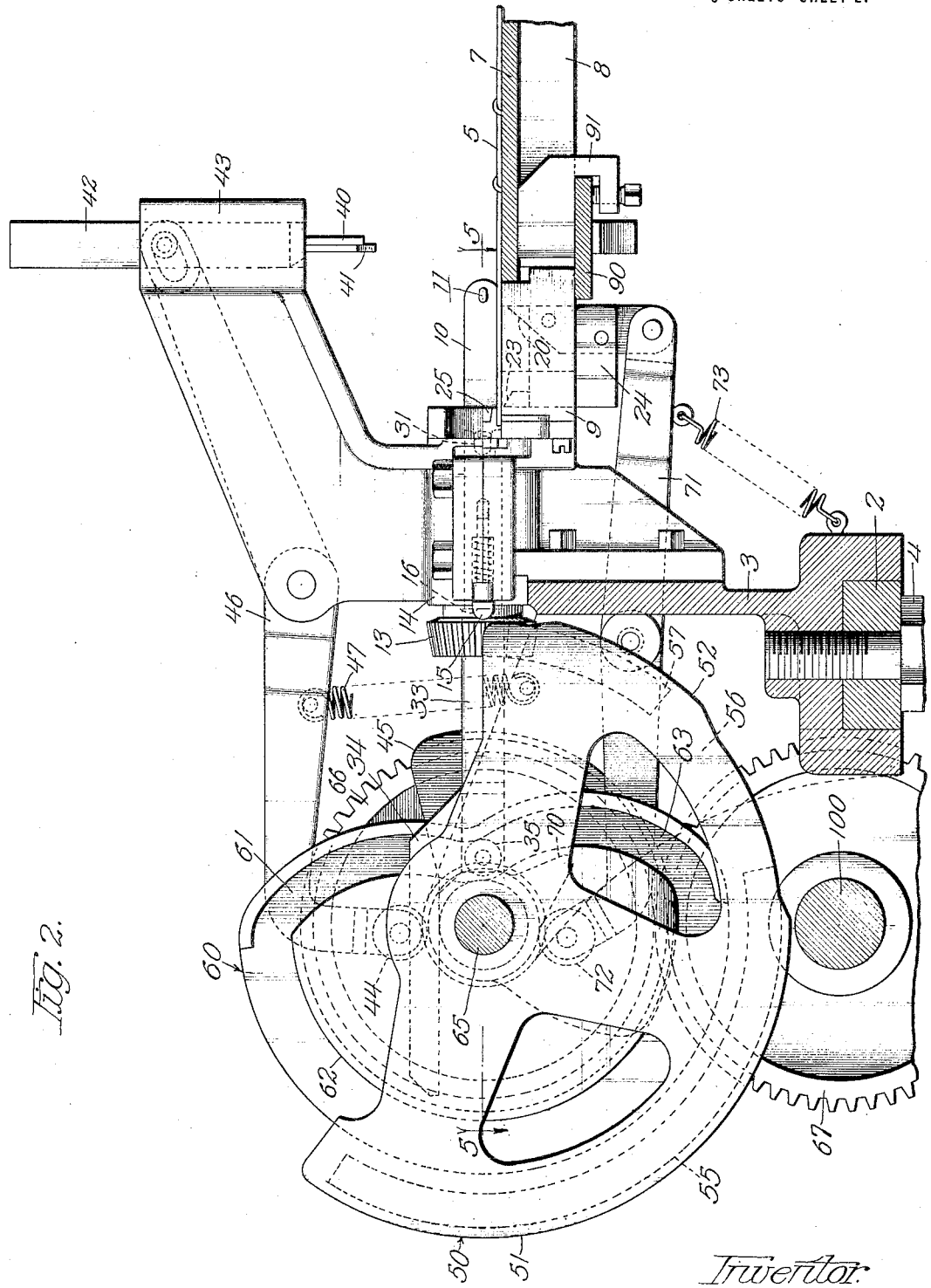

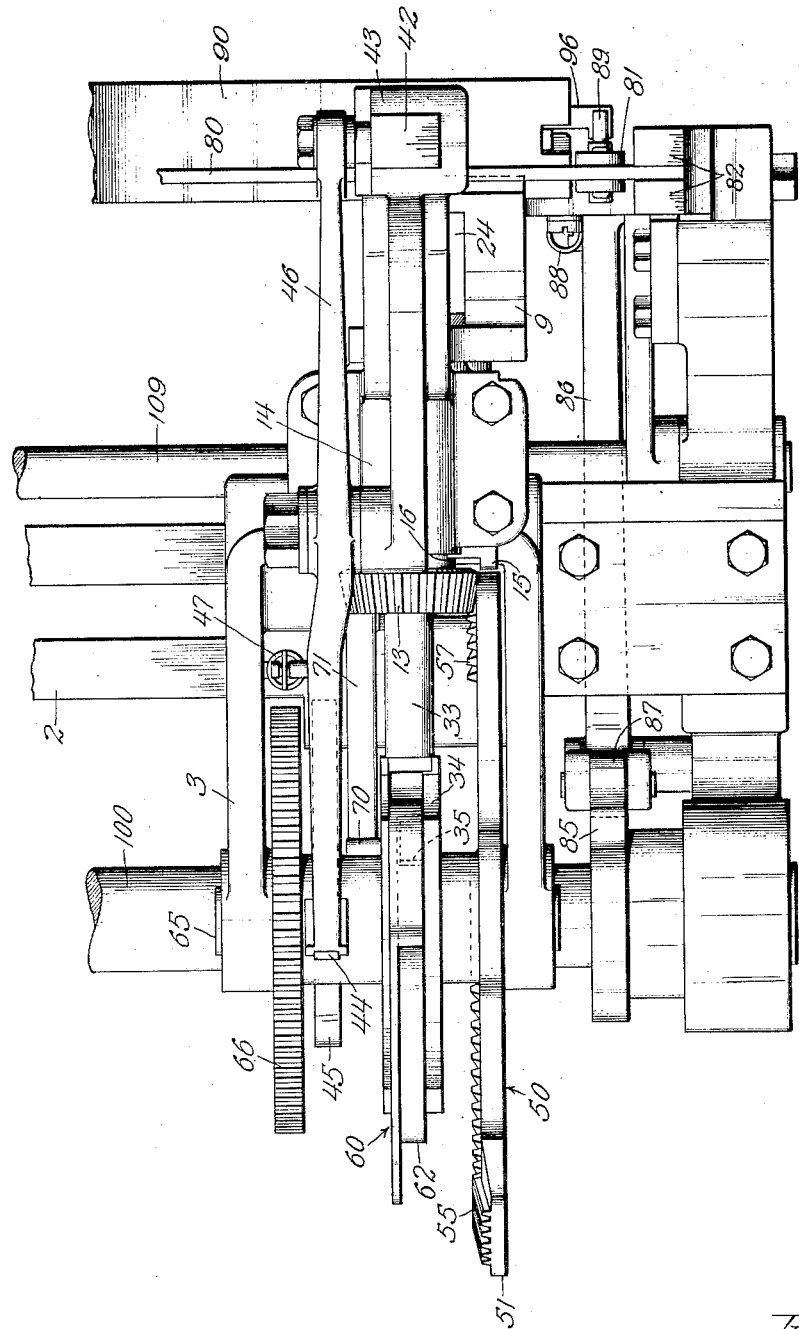

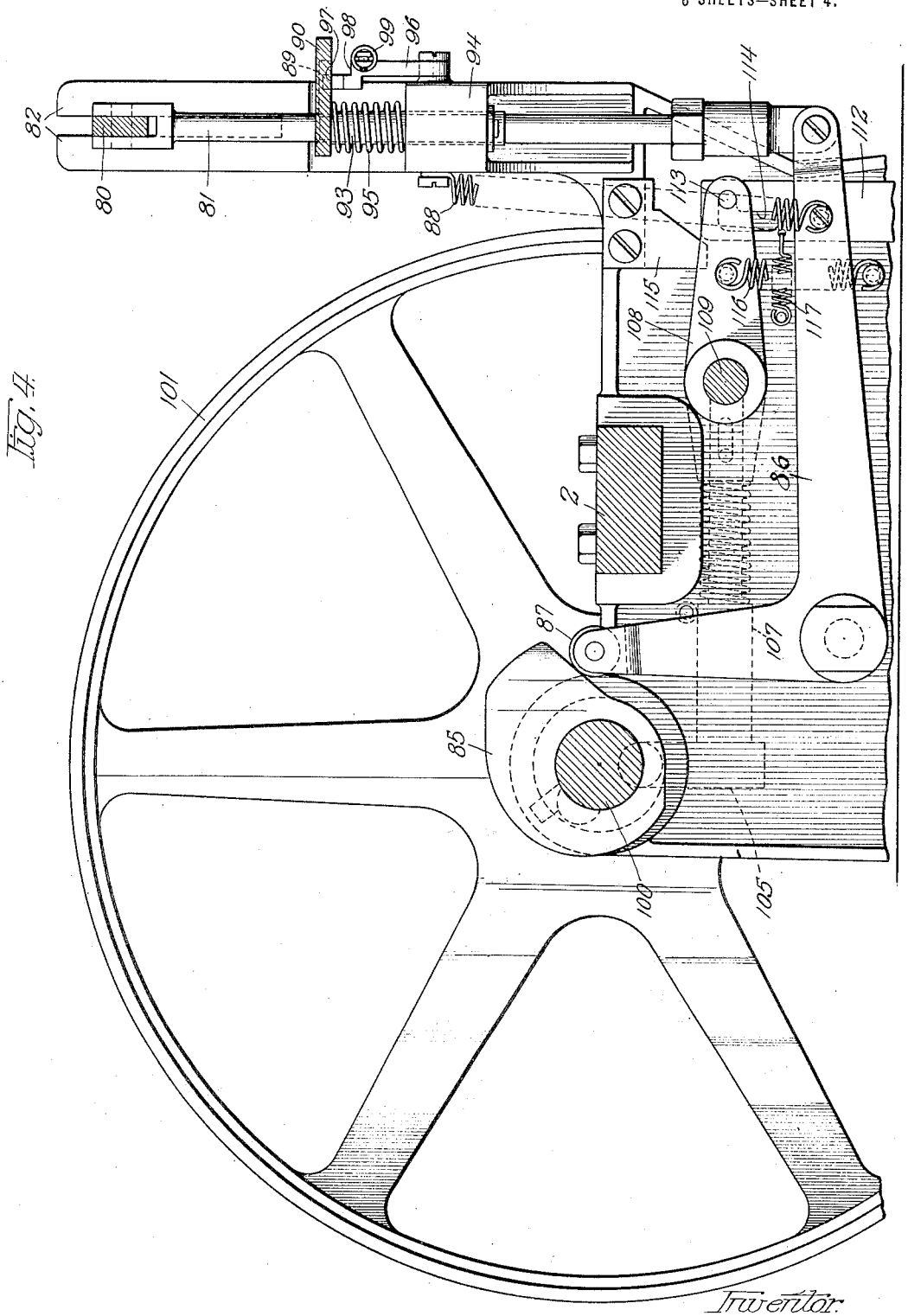

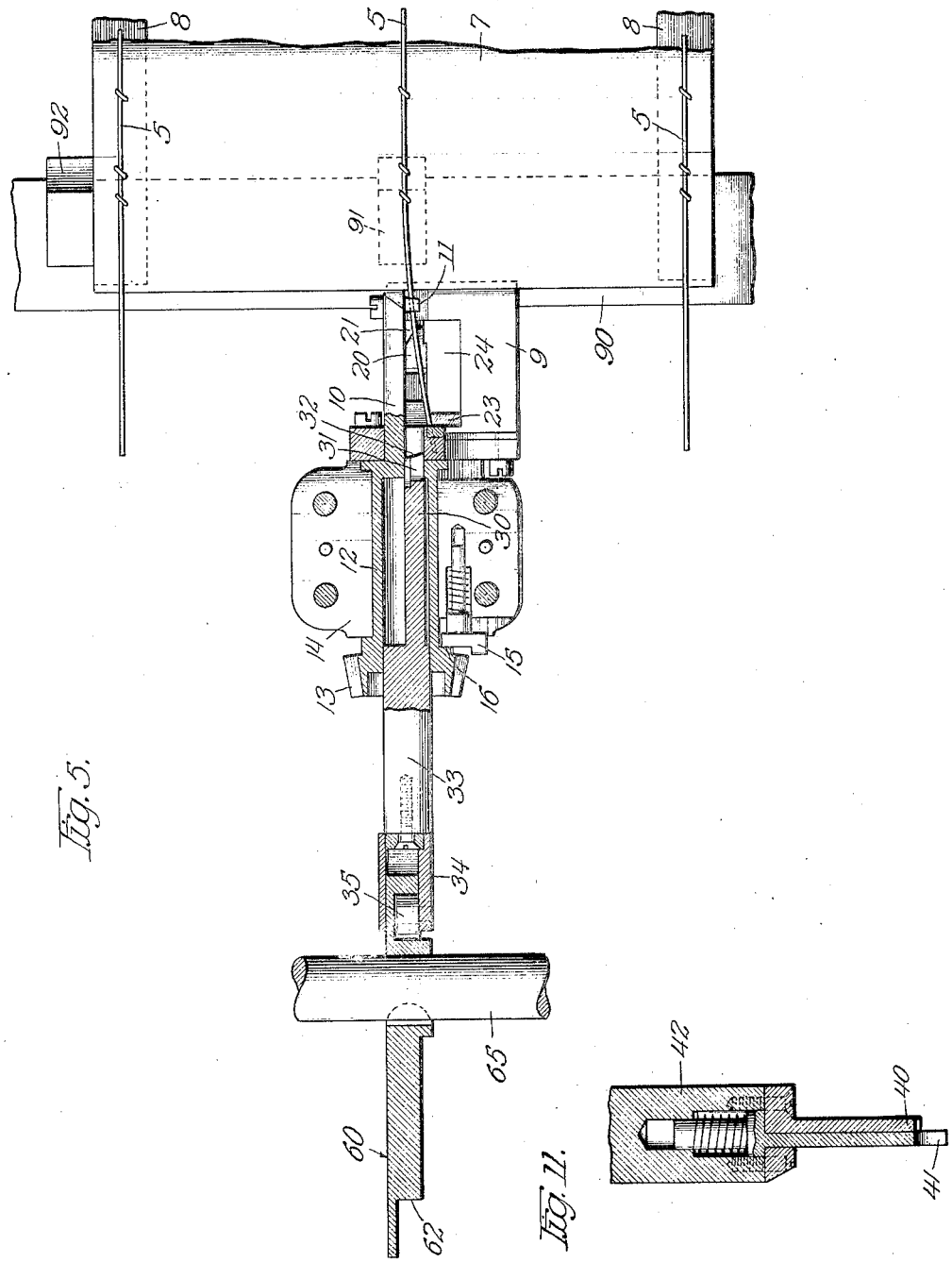

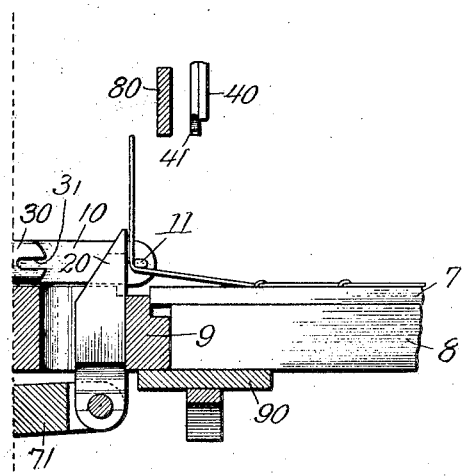
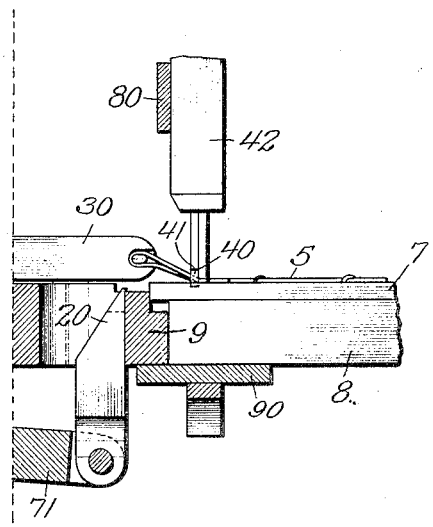
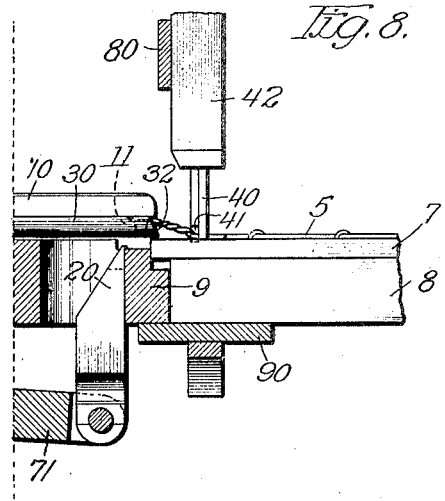
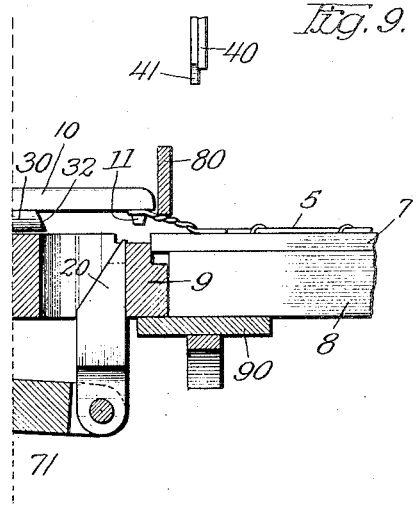
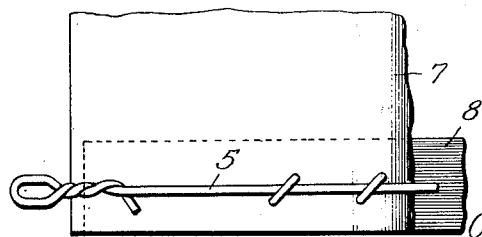

OSCEOLA C. THOMPSON, OF WHITE PLAINS, NEW YORK, ASSIGNOR TO WIREBOUNDS PATENTS COMPANY, OF KITTERY, MAINE, A CORPORATION OF MAINE.

MACHINE FOR USE IN MAKING BOX PARTS OR BOXES.

1,410,422.  Specification of Letters Patent.  Patented Mar. 21, 1922.

Application filed July 25, 1918. Serial No. 246,772.

*To all whom it may concern:*

Be it known that I, OSCEOLA C. THOMPSON, a citizen of the United States, residing at White Plains, in the county of Westchester, State of New York, have invented an Improvement in Machines for Use in Making Box Parts or Boxes, of which the following is a specification.

This invention relates to machines for supplying wires on wirebound box parts with fastening means by which such box parts may be connected one with another.

Objects of the invention, amongst others, are to provide fastener-supplying mechanism and cooperating work-controlling means by which the wires of wirebound box parts may be supplied with fasteners in desired or proper relation to the box parts; to provide a machine for concurrent operation upon the several wires of a wirebound box part; to provide mechanism for supplying the wires with fasteners by forming and twisting a bight directly upon the wire itself; and to provide various improvements contributing to the general practicability and efficient functioning of such machine.

The character of the invention may be understood by reference to one form of machine embodying the invention adapted to supply one desirable form of fastener, both of which are shown for illustration in the accompanying drawings.

In the drawings,

Fig. 1 is a front elevation of the illustrative machine, intermediate parts being broken away;

Fig. 2 is a vertical section on line 2—2 of Fig. 1 showing one of the fastener-supplying units in side elevation;

Fig. 3 is a plan view of the mechanism shown in Fig. 2;

Fig. 4 is a vertical section on line 4—4 of Fig. 1;

Fig. 5 is a horizontal section on line 5—5 of Fig. 2, with a plan view of a box part presented to the machine;

Figs. 6, 7, 8 and 9 are detail views illustrating successive operations of the fastener-supplying mechanism;

Fig. 10 is a plan view of a completed fastener;

Fig. 11 is a detail section on line 11—11 of Fig. 1;

The illustrated machine comprises a number of fastener-supplying units 3 corresponding respectively to the wires of a wirebound box part which are intended to be supplied with fastening means.

These units are arranged in desired alinement and preferably operate simultaneously to supply fasteners to the wires 5 previously secured to the box part 7, the latter illustrated for example in Fig. 5 as one of the side sections of a wirebound box blank. The character of the fastening means supplied by this specific mechanism is shown in Fig. 10. This fastener consists of a bight formed directly upon the binding wire itself by bending back the free end of the wire and twisting the legs of the bight, and my invention includes special features of improvements operating to supply this type of fastener.

The illustrative form of fastener-supplying unit will be first described, such units being in this instance wire bending and twisting mechanisms.

Referring to Figs. 1 to 4 inclusive, each bending and twisting mechanism comprises a rotatable twisting member 10 having a lateral extension 11 which serves as a forming stud around which, while the stud remains stationary, the wire is bent, whereafter the stud is rotated upon the longitudinal axis of the twisting member so as to twist together the legs of the bight as shown in Fig. 8. The bending is done by successively operating wipers or benders 20 and 30, one working transversely and the other associated with and moving longitudinally of the twister. The initial relationship of these elements when the wired box part is introduced to the machine is indicated in Figs. 2 and 5, showing the wire presented below the forming stud. In operation, first the wiper 20 moves upward and bends the wire on the stud approximately at a right angle, as shown in Fig. 6. In this movement, the beveled surface 21 on the wiper crowds the wire toward the face of the twister. The wiper 20 is then immediately withdrawn. Meanwhile, the second wiper 30 is advancing, and by the time the wiper 20 is out of the way it engages and bends the wire back on itself to form the bight as shown in Fig. 7. The wiper 30 has at its end a slot 31 of differential depth to straddle the forming stud and the bend of the wire, the deeper portion of the slot being at the side of said wiper adjacent the face of the twister, and is also provided with a bevel 32 to crowd the wire against the twister during the bending operation. As said wiper 30 advances on the twister, it engages the portion of the wire previously bent around the stud 11 by the wiper 20 and bends it further around the stud until the recess or slot 31 closes over the wire, as shown in Fig. 7, thus forming and holding the bight on the twister. Following this operation the legs of the bight are clamped upon the box part by a clamping element 40, associated with which is a yielding bevelled element 41 which, during the descent of the clamping element, deflects the free end of the wire to that side of the main body of the wire corresponding to the direction of the rotation of the twister. In this instance the deflection is toward the left and the rotation of the twister is contra-clockwise. The twister together with the wiper 30, which is virtually a movable part of the twister and insures the retention of the wire on the forming stud during the twist, is now rotated to give the wire any suitable number of twists as predetermined, and, the free end of the wire being at the left of its main body, and the direction of twisting being contra-clockwise, the operation causes the extremity of the wire to be positioned beneath the main body of the wire as shown in Fig. 8. The twisting operation preferably terminates with the forming stud projecting downwardly, permitting the bight to be stripped off the stud and also leaving the plane of the bight substantially parallel with the face of the box part, which is desirable in some cases to facilitate fastenings of adjacent box parts. Upon termination of the twisting operation, the wiper 30 recedes and the bight is then stripped from the twister by means hereinafter referred to, whereupon, with the wiper still retracted, the twister is given a further rotation to restore the forming stud 11 to its initial position ready for a subsequent operation.

The constructional details of the twister and associated wiper 30 will be apparent from Fig. 5. The twister comprises an arm extending endwise from a journal portion 12, and the wiper 30 comprises a complemental arm extending from a part 33 which is slidable in the journal portion 12, and the rear end of which is swiveled or rotatably secured to a yoke 34 carrying a roller 35.

The several movements of the parts described above, and which are desirable when the illustrative form of fastening means is to be supplied, may be produced in any practicable manner. For example the twister is journaled in a bearing 14 and provided with a beveled pinion 13 for actuation by a segment gear 50. The twister is normally locked against rotation by a spring-pressed detent 15 engaging a notch 16 or a similar notch, not shown in the pinion 13. Cam surfaces 51 and 52 on the segment gear are adapted to displace the detent and release the twister for rotation at the proper intervals. The teeth 55 of the segment gear mesh with the pinion 13 for actuating the same for the twisting operation. The mutilation 56 of the gear then allows a dwell during the retraction of the wiper and the stripping of the bight from the forming stud. Additional teeth 57 then engage the pinion to rotate the twister sufficiently to restore it to its initial or starting position shown in Fig. 2. The bending of the wire by the wipers 20 and 30 occurs during the interval before the teeth 55 move into engagement with the pinion. For actuating the wiper 30, the roller 35 is engaged by a cam groove 61 of a cam 60 to advance the wiper, then travels on a surface 62 which holds the wiper advanced during the twist, then passes into a cam groove 63 which retracts the wiper during the interval between the segment gear teeth 55 and 57 while the twister remains stationary. To hold the roller 35 at a proper elevation, to prevent jamming, the legs of the yoke 34 straddle the cam 60 and rest upon the hub of said cam.

The movement of the wiper 20, which precedes that of the wiper 30, may be effected from a cam 70 through a lever 71, provided with roller 72, the lever being actuated by the cam to elevate said wiper and retracted by a spring 73. Operable with the wiper 20 is a movable knife 23 cooperating with a fixed knife 25 to sever the end of the wire to insure the production of bights from uniform desired lengths of material. The wiper and movable knife as shown are carried by a cross head 24 movable vertically in a guide provided by a block 9 which is affixed to the bracket 3 and functions in gauging the work. The edge of the wired box part abuts against said block 9 in the presentation of the wire to the bending and twisting mechanism. While the knife is movable simultaneously with the wiper 20, it may coact with the fixed knife to sever the wire practically in advance of the effective operation of the wiper. It will be noted that the cutter mechanism is slightly to the left of the forming stud 11, so that if the wire is sufficiently long to need severing it may be presented between the knives laterally of the twister. The V-shaped space between the fixed knife 25 and the upper surface of the block 9 provides a guide for inserting the wire, and the slant of the cutting edge of the movable knife 23 tends to move the severed wire toward the twister, this movement being further promoted in the preliminary bending operation of the wiper 20 by the bevel 21 of that wiper.

The previously-mentioned bight-clamping element 40, with its associated wire deflecting element 41, is carried by a head 42 movable vertically in a guide 43 on an arm projecting from the bracket 3. This device is depressed immediately following the operation of the wiper 30. As before explained, the deflector 41 pushes the extremity of the wire to the left of the main body of the wire, and the clamp 40 then clamps both wires, the element 41 yielding upwardly. The lower end of element 40 is shaped to straddle the bight. The element 41 is yieldingly held in advance of the other by a concealed spring. The device is operated by a lever 46 having a roller 44 engaged by a cam 45 to depress and hold the clamp down on the work during the twisting operation and to release it after the stripping operation. The depression may occur during the advance of the wiper 30 but is timed to bring the clamp upon the work just after the bending. To raise the clamp the lever 43 is retracted by a spring 47.

It will be understood that there may be any number of the units thus described, according to the number of wires on the box part to be supplied with fastening means. These units are represented as independent mechanisms mounted in the brackets 3 which are adjustably secured on a slotted cross-member 2 of the machine frame and secured by screw clamps 4, so that the units can be moved laterally for spacing them to correspond with the spacing of the wires of the box part. The actuating gear and cams of each unit are mounted on a shaft 65 having a gear 66 meshing with a gear 67 on a shaft 100 which extends across the machine and from which the several units are driven, the gears 67 being feathered and secured by set screws on said shaft 100 so as to be adjustable thereon with the respective units.

The stripping of the bight from the forming studs 11 after the twisting operation may be effected by a stripper bar 80 arranged across the machine in front of the bending and twisting units and adapted to descend and push down the work. This stripper bar is carried by rods 81 vertically movable in guides 82 at the ends of the machine and actuated from cams 85 on shaft 100 through levers 86 connected to said rods. The stripper bar is depressed by the engagement of the cams against rollers 87 on the levers and is elevated by retractile springs 88.

It is important that the wired box part and the wire carried thereby be accurately gauged or positioned definitely in relation to the twisting and bending or other fastener-supplying mechanism, so that the fastener, when ultimately provided, shall be positioned in desired relationship to the box part, as for example in relation to the edge of a wirebound box section. For this purpose the illustrative machine is provided with work-controlling means including the blocks 9 for abutment of the edge of the box part and a movable work-supporting table 90 and associated parts which supports the work properly positioned laterally and with the wires at the proper elevation. Adjustably secured on the table are blocks 91 for supporting the sheet material of the wirebound box blank or section 7 between its cleats, it being understood that such a blank or section usually comprises a sheet of wood veneering having end cleats, designated 8 in the drawings, and binding wires stapled through the veneering to the cleats. Where the fastener-supplying operation is upon a wire over a cleat, the cleat itself will furnish a sufficient support for the clamping of the bight on the box section by the clamping element 40, but where the operation is upon one of the intermediate wires one of the blocks 91 should be adjusted to position thereunder to afford a support corresponding to the thickness of the cleat. There is also on the work table a positioning device or guide 92, which may conveniently be a duplicate of a block 91, to engage a side of the box part, as shown in Fig. 5, and which may be adjustable along the table to accommodate different widths of box sections.

The work table is represented as guided by means of depending rods 93 vertically movable in guides 94. It is forced upwardly by springs 95 against the under-sides of the blocks 9 and is rigidly supported during the fastener-supplying operation by means of tripping elements 96 which as shown consist of pivoted angle levers having notched projections 97 which work in slots in the ends of the table and support the same in the shoulders provided by the notches of said projections. After the fastener-supplying operation, when the stripper bar descends, tappets or studs 89 on the rods 81 engage and trip the elements 96 and allow the table to be forced down by the stripper bar 80 to ledges 98 on said elements, this being a sufficient depression of the table to permit stripping of the work from the forming studs, whereupon the work can be withdrawn. Upon release of the table by the upward movement of the stripper bar, it is forced upwardly by the springs 95 and the tripping elements 96 are actuated by springs 99, connected with depending studs on the table, causing said elements to snap back into position to support the table in its elevated position. The work is thereby properly gauged by the table with its guide 92 and the blocks 9.

Referring to the box part 7, it will be noted that the edge of its sheet material projects somewhat beyond the ends of its cleats 8. The box blank is preferably made in this manner to provide overlap margins for the veneer sheets so that when folded into box form the edges of adjacent sheets may overlap one the other. Therefore the front faces of the abutment blocks 9 are correspondingly formed by rabbeting their upper parts so as to provide abutments for the ends of the cleats and for the edge of the sheet. The upper parts of the blocks 9 are also formed with depressed surfaces for the wires.

It will be noted that the axis of the twister 10 is in a somewhat higher plane than that of the box part 7, whereby clearance for the rotation of the parts is afforded and the twisted bight is formed, as is desirable, slightly above the surface of the material.

It will also be noted that the blocks 9, against which the cleat ends abut, gauge the position of the fastener-supplying operation from the cleat ends. This is particularly advantageous in that the fasteners formed at both ends of a box blank will lie equal distances from the corner edge of the box when the blank is folded into box form.

The operation may be briefly summarized as follows: It will be understood that the work is positioned by placing it upon the table 90 against the abutment blocks 9, and moving it laterally against the guide 92, the ends of the wires 5 being presented and guided laterally between the knives 23 and 25, and the wires coming under the forming studs 11 of the respective twisters.

The work being thus positioned, and the machine being set in motion, the movable knife 23 and the wiper 20 are first actuated and retracted, cutting and bending up the wire; and the advancing wiper 30 then bends back and closes over the wire on the stud 11 to form the bight. Meanwhile the twister and forming stud 11 remains stationary, the twister pinion being locked by the latch 15. As the said wiper 30 completes its forward movement; the deflecting element 41 descending with the clamp 40 engages and pushes the wire to the left of the main body of the wire and then yields upwardly as the clamp 40 further descends and clamps the bight. The twister being now released by the latch 15 is rotated to twist the bight, terminating its operation with the forming stud 11 projecting down, whereupon the twister is again locked and the wiper 30 retracted. By this time the descending stripper bar 80 engages the work and strips the bight from the forming stud, the work table supports 96 having been tripped to allow the descent of the table with the work. The clamp 40 is immediately raised, and the twister is again unlatched and rotated slightly to restore it to its initial position ready for operation upon a second wired box section.

The machine is preferably designed for a single cycle of operation, automatically stopping with the mechanism in the position shown in Fig. 2. For this purpose, any approved automatic throw out clutch may be employed for clutching the power pulley 101 to the shaft 100, said clutch being controlled by any convenient means, as a pedal or foot lever adapted to be depressed by the operator, after the work is inserted, to cause clutching of the power with the machine. The clutch will automatically release, and by suitable braking or rebound-preventing devices, associated therewith, insures the stopping of the parts in the proper initial relation. The character of such clutches is well known and need not to be more specifically referred to.

In the illustrated machine the clutch is thrown out by striking of a clutch dog 105 against a buffer stop 107 carried by a rocker shaft 109, and is thrown in upon release of said dog by displacement of the stop 107, the shaft 109 being rocked to displace the stop by a foot lever (not shown) and being automatically reversed to restore the stop so as to insure the throw out of the clutch at the proper time, even though the operator should continue to keep the foot lever depressed. This is accomplished by illustrated devices in connection with the lift rod 112 which conveys motion from the foot lever to the rocker shaft 109. An arm 108 extending from said rocker shaft carries a stud 113 engaged in an L-shaped slot 114 in the upper end of the lift rod 112, whereby the upward movement of the latter rocks the shaft to displace the buffer stop 107. In the upward movement of the lift rod 112, it is forced by a cam 115 into position to allow the stud 113 to enter the opposite end of the L-shaped slot 114, and the arm 108 is retracted by a spring 116 to restore the stop 117 to position. A spring 117 tends to hold the lift rod 112 in position to engage the stud 113 as shown.

Obviously the present invention is not limited to any particular structural details or mode of operation or to any especial type of fastener to be supplied. On the contrary the mechanical details, the mode of operation and the character of fastener supplied may be variously modified. Furthermore it is not indispensable that all the features of the invention be used conjointly since they may be used to advantage in various different combinations and subcombinations.

Having now described my invention, I claim:—

1. A machine for use in making boxes, functioning to provide a wired box part with fastening means for connection with another box part, which comprises, in combination, fastener-supplying mechanism; work-positioning means for relatively locating said mechanism and a box part having wire thereon; means for operating said mechanism to provide said wire with such fastening means; and means for stripping the fastening means from said mechanism.

2. A machine for use in making boxes comprising, in combination, fastener-supplying mechanism comprising wire-manipulating elements to provide a piece of wire with fastening means; work-positioning means for relatively locating said mechanism and a box part having wire thereon, whereby said mechanism may provide said wire with fastening means in desired relation to the box part; and means for stripping the fastening means from said mechanism.

3. A machine for use in making boxes comprising, in combination, fastener-supplying mechanism constructed to provide a piece of wire with fastening means; work-positioning means for relatively locating said mechanism and a wired box part; and stripper-mechanism for disengaging the box part from the fastener-supplying mechanism.

4. A machine for use in making boxes, functioning to provide a wired box part with fastening means for connection with another box part, comprising, in combination, fastener-supplying mechanism constructed and arranged to receive a wire of a wired box part; means for operating said mechanism to provide said wire with such fastening means; means determining the relation to said box part of the fastening means so provided; and means for automatically stripping said fastening means from said fastener-supplying mechanism.

5. A machine for use in making boxes comprising, in combination, mechanism to supply a wire secured to a box part with fastening means for connection with another box part; means for positioning said wired box part relatively to said fastener-supplying mechanism; means for operating said fastener-supplying mechanism to provide said wire with such fastening means when said wired box part is in desired position; and means for automatically stripping said fastening means from said fastener-supplying mechanism.

6. A machine for use in making boxes comprising, in combination, fastener-supplying mechanism including wire bending and twisting elements, constructed to provide a piece of wire with fastening means; work-positioning means for relatively locating said bending and twisting elements and a box part having wire secured thereto, whereby said mechanism may provide said wire with fastening means positioned in desired relation to the box part; and means for stripping said fastening means from said mechanism.

7. A machine for use in making boxes, functioning to provide wires secured to a box part with fastening means for connection with another box part comprising, in combination, a plurality of fastener-supplying units operative upon wires of a wired box part to provide fastening means thereon; work-positioning means to relatively locate said box part and said fastener-supplying units; means to operate said plurality of fastener-supplying units concurrently; and a common positive stripper to disengage the work from said units.

8. A machine for use in making wire-bound box blanks comprising, in combination, means to sever the wires secured to a box blank; mechanism to supply said wires with fastening means; and work-controlling means for relatively positioning said mechanism and the box blank during a fastener-supplying operation.

9. A machine for use in making boxes, functioning to provide a wired box part with fastening means for connection with another box part, which comprises, in combination, mechanism to supply wires secured to box parts with fastening means; means to sever said wires; and work-positioning means for relatively locating said mechanism, severing means, and box parts.

10. A machine for use in making boxes comprising, in combination, mechanism to supply wires secured to box parts with fastening means; means to sever said wires; work-positioning means for controlling the presentation of said wired box parts to said mechanism and said severing means; and means for operating said mechanism and severing means to sever said wires and provide the same with fastening means when said wired box parts are in desired position.

11. A machine for use in making boxes, functioning to provide a wired box part with fastening means for connection with another box part, which comprises, in combination, work-positioning means for a box part having wire thereon; wire severing means; fastener-supplying mechanism arranged for presentation of said wire thereto in the positioning of said box part; and means for operating said severing means and said mechanism to provide said wire with such fastening means in desired relation to said box part.

12. A machine for use in making boxes comprising, in combination, mechanism to supply a wire secured to a box part with fastening means for connection with another box part; means for severing the end of said wire; means for positioning said wired box part relatively to said severing means and said fastener-supplying mechanism; and means for operating said severing means and said fastener-supplying mechanism to provide said wire with such fastening means when said wired box part is in desired position.

13. A machine for use in making boxes, functioning to supply a wired box part with fastening means for connection with another box part comprising, in combination, a cutter and fastener-supplying mechanism successively operating upon a wire of the wired box part; work-controlling means for relatively locating said cutter mechanism and wired box part; and means for operating said cutter and said mechanism for cutting and equipping said wire with fastening means in desired relation to said box part.

14. A machine for use in making boxes, functioning to provide the wires of a wired box part with fastening means for connection with another box part, comprising, in combination, mechanism operative upon a wire of a wired box part to equip said wire with fastening means including a wire bender, and cutter operable concurrently with the bender; and work-controlling means for positioning said wired box part relatively to said cutter and said mechanism.

15. A machine for use in making wirebound boxes having separate sections of cleats and side material connected by binding wires secured thereto comprising, in combination, mechanism to supply wires secured to box sections with connecting means; and cleat-engaging controlling means for relatively positioning said mechanism and the box parts during a fastener-supplying operation.

16. A machine for use in making boxes comprising, in combination, mechanism to supply a wire secured to a box part with fastening means for connection with another box part; cleat-engaging positioning means for relatively locating said wired box part and said mechanism; and means for operating said fastener-supplying mechanism to provide said wire with such fastening means.

17. A machine for use in making wirebound box blanks having separate sections of cleats and overlying side material connected by binding wires, comprising, in combination, mechanism to supply fasteners to the ends of wires secured to a box blank; and cleat-engaging positioning means to relatively position the box blank and said mechanism during a fastener-supplying operation whereby the fasteners thus formed are positioned the same distance from the corner of the box when the blank is folded into box form, as fasteners similarly formed on the other ends of the wires by the same machine are positioned.

18. A machine of the class described comprising, in combination, a cleat-engaging front edge gauge for a wired box part; mechanism positioned relative to said gauge to operate on a wire on said box part to supply the same with fastening means for connection with another box part; said mechanism adapted to engage the wire in a predetermined relation to said box part; and operating means for said mechanism.

19. A machine for use in making wirebound boxes comprising, in combination, mechanism to form a bight on the end of a wire secured to a box part, including means to form a bight with an opening longer than the width of the bight whereby an identical bight may be passed therethrough; and work-controlling means to relatively position said mechanism and the box part during a bight-forming operation.

20. A machine for use in making boxes, functioning to provide a wire secured to a box part with fastening means for connection with another box part comprising, in combination, fastener-supplying mechanism comprising a rotatable twister provided with a forming element and successively operating devices to bend the wire on said element; and work-positioning means to relatively locate a wired box part and said mechanism during a fastener-supplying operation.

21. A machine for use in making boxes, functioning to provide a wire secured to a box part with fastening means for connection with another box part comprising, in combination, fastener-supplying mechanism comprising a wire twister and a bending device operable longitudinally of the twister; and work-positioning means for relatively locating the box part and said mechanism during a fastener-supplying operation.

22. A machine for supplying wires on wirebound box parts with fastening means for connecting such parts one with another, which comprises, in combination, a plurality of fastener-supplying units for operation on a plurality of wires of a box part presented thereto to provide said wires with such fastening means; means to position said box part relative to said units; means for concurrently operating said units; and means for stripping such fastening means from said fastener-supplying means after a fastener-supplying operation.

23. A machine for supplying wires on wirebound box parts with fastening means for connecting such parts one with another, which comprises, in combination, a plurality of wire-severing and fastener-supplying units arranged for operation on a plurality of wires of a box part presented thereto to sever the wires and provide the same with such fastening means; means to position said box part relative to said units; and means for concurrently operating said units.

24. A machine for use in making boxes comprising in combination, fastener-supply mechanism operating upon a wire of a wired box part to provide fastening means thereon; work-positioning means for relatively locating said mechanism on a wired box part; automatic means for displacing said work-positioning means and means to strip said fastening means from said mechanism.

25. A machine for use in making boxes comprising, in combination, fastener-supplying mechanism operative upon a wire of a wired box part to provide fastening means thereon; work-positioning means including a front edge gauge, and a movable support having guiding means thereon; means to strip said fastening means from said mechanism; and operating means therefor.

26. A machine for use in making boxes comprising, in combination, fastener-supplying mechanism operative upon a wire of a wired box part to provide fastening means thereon, including bending and twisting mechanisms to provide a bight; a clamp to hold the legs of the bight on the box part during the twisting operation; and means for relatively positioning said mechanism and a wired box part during the fastener-supplying operation.

27. A machine for use in making boxes comprising, in combination, mechanism operative upon a wire of a wired box part to equip said wire with fastening means, a work support, trip means supporting the same, a stripper, and means for tripping said trip means to release said work support in the stripping operation.

In testimony whereof, I have signed my name to this specification.

OSCEOLA C. THOMPSON.